US010410606B2

(12) United States Patent
Josephirudayaraj et al.

(10) Patent No.: US 10,410,606 B2
(45) Date of Patent: Sep. 10, 2019

(54) RENDERING GRAPHICAL ASSETS ON ELECTRONIC DEVICES

(71) Applicant: INTUIT INC., Mountain View, CA (US)

(72) Inventors: Mangala Naveen Kumar Josephirudayaraj, Bangalore (IN); Kapil Bhalla, New Delhi (IN); Santosh Katta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/025,879

(22) Filed: Jul. 2, 2018

(65) Prior Publication Data

US 2018/0315400 A1    Nov. 1, 2018

Related U.S. Application Data

(63) Continuation of application No. 14/701,249, filed on Apr. 30, 2015, now Pat. No. 10,032,438.

(51) Int. Cl.
| | | |
|---|---|---|
| G09G 5/373 | (2006.01) | |
| G09G 5/36 | (2006.01) | |
| G06T 3/40 | (2006.01) | |
| G06F 3/14 | (2006.01) | |
| G09G 5/00 | (2006.01) | |

(52) U.S. Cl.
CPC .............. *G09G 5/373* (2013.01); *G06F 3/14* (2013.01); *G06T 3/4092* (2013.01); *G09G 5/00* (2013.01); *G09G 5/363* (2013.01); *G06T 2200/16* (2013.01); *G09G 2320/0606* (2013.01); *G09G 2320/0613* (2013.01); *G09G 2320/0666* (2013.01); *G09G 2320/08* (2013.01); *G09G 2320/10* (2013.01); *G09G 2340/04* (2013.01);

(Continued)

(58) Field of Classification Search
None
See application file for complete search history.

(56) References Cited

U.S. PATENT DOCUMENTS

| | | |
|---|---|---|
| 6,166,738 A | 12/2000 | Robertson et al. |
| 6,353,448 B1 | 3/2002 | Scarborough et al. |

(Continued)

FOREIGN PATENT DOCUMENTS

WO      2013049162 A1      4/2013

OTHER PUBLICATIONS

Canadian Office Action dated Aug. 1, 2018 for Application No. 2,983,248.

(Continued)

*Primary Examiner* — Hilina K Demeter
(74) *Attorney, Agent, or Firm* — Patterson + Sheridan, LLP

(57) ABSTRACT

Certain aspects of the present disclosure provide techniques for. The disclosed embodiments provide a system that facilitates execution of an application on an electronic device. During operation, the system obtains a font file comprising a set of scalable representations of graphical assets used in the application. Next, the system obtains a layout of a user interface of the application. The system then obtains, from the layout, a mapping of a user-interface element in the user interface to a scalable representation of a graphical asset in the font file. Finally, the system uses the mapping and the scalable representation to render the graphical asset in the user interface based on an attribute of a screen in the electronic device.

17 Claims, 6 Drawing Sheets

(52) U.S. Cl.
CPC . *G09G 2340/0442* (2013.01); *G09G 2340/14* (2013.01); *G09G 2354/00* (2013.01)

(56) References Cited

U.S. PATENT DOCUMENTS

| | | | |
|---|---|---|---|
| 6,414,677 B1 | 7/2002 | Robertson et al. | |
| 6,504,545 B1* | 1/2003 | Browne | G06F 17/214 |
| | | | 345/473 |
| 7,461,353 B2* | 12/2008 | Rohrabaugh | H04L 67/2823 |
| 8,566,711 B1* | 10/2013 | Srivastava | G06F 17/212 |
| | | | 715/243 |
| 2004/0217956 A1 | 11/2004 | Besl et al. | |
| 2005/0012755 A1 | 1/2005 | Dresevic et al. | |
| 2007/0211062 A1* | 9/2007 | Engelman | G06T 11/203 |
| | | | 345/467 |
| 2009/0109227 A1 | 4/2009 | Leroy | |
| 2010/0329642 A1* | 12/2010 | Kam | G06F 3/04817 |
| | | | 386/280 |
| 2011/0041074 A1* | 2/2011 | Bells | G06F 8/38 |
| | | | 715/744 |
| 2012/0098863 A1* | 4/2012 | Almstrand | G06F 3/0487 |
| | | | 345/650 |
| 2012/0162238 A1 | 6/2012 | Fleck et al. | |
| 2013/0027404 A1* | 1/2013 | Sarnoff | G06T 1/20 |
| | | | 345/441 |
| 2013/0194277 A1 | 8/2013 | Takishima | |
| 2013/0235073 A1 | 9/2013 | Jaramillo et al. | |
| 2013/0318456 A1* | 11/2013 | Lacey | G06F 8/38 |
| | | | 715/765 |
| 2014/0013206 A1 | 1/2014 | Jang | |
| 2014/0143252 A1* | 5/2014 | Silverstein | G06Q 10/105 |
| | | | 707/737 |
| 2014/0176563 A1 | 6/2014 | Kaasila et al. | |
| 2014/0229314 A1 | 8/2014 | Datar et al. | |
| 2014/0325373 A1 | 10/2014 | Kramer | |
| 2015/0091947 A1* | 4/2015 | Rakow | G09G 5/373 |
| | | | 345/667 |
| 2015/0339268 A1* | 11/2015 | Bednarz, Jr. | G06F 16/986 |
| | | | 715/248 |
| 2015/0346954 A1 | 12/2015 | Parag et al. | |
| 2015/0348278 A1* | 12/2015 | Cavedoni | G06F 17/214 |
| | | | 345/467 |
| 2015/0348297 A1* | 12/2015 | Kaasila | G06T 1/20 |
| | | | 345/467 |

OTHER PUBLICATIONS

Office Action issued in Australian application No. 2016256364 dated Jun. 29, 2018.
International Search Report and Written Opinion dated Aug. 29, 2016 for Application No. PCT/US2016/029226.
Extended European Search Report dated Aug. 17, 2018 for Application No. 16786970.0.
Australian Examination Report issued to Applicaiton No. 2016256364 dated Apr. 21, 2019.
Canadian Office Action for Application No. 2,983,248 dated Apr. 24, 2019.
Håkan Reis, "Fonts as scalable vector graphics", www.jayway.com, p. 1, https://blog.jayway.com/2013/06/06/fonts-as-scalable-vector-graphics/, Jun. 6, 2013, 30 total pages.

* cited by examiner

RENDERING GRAPHICAL ASSETS ON ELECTRONIC DEVICES

CROSS-REFERENCE TO RELATED APPLICATIONS

This application is a continuation of co-pending U.S. patent application Ser. No. 14/701,249, entitled "Rendering Graphical Assets Natively on Multiple Screens of Electronic Devices," filed on Apr. 30, 2015, which is incorporated herein by reference in its entirety.

BACKGROUND

The disclosed embodiments relate to managing graphical assets on electronic devices. More specifically, the disclosed embodiments relate to techniques for rendering graphical assets on multiple screens of electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

On the other hand, the diversity of display technologies in modern electronic devices may complicate the creation and management of graphical UI components across the electronic devices. For example, a set of images, icons, and/or other graphical assets may be displayed within the UI of a mobile application. To support rendering of the graphical assets on mobile devices with various combinations of form factors, screen sizes, pixel densities, and/or resolutions, the graphical assets may be duplicated in different sizes, and the mobile application may be packaged with the duplicated graphical assets. A given size of a graphical asset may then be selected for display on a screen of a mobile device based on the screen size, pixel density, resolution, and/or other attribute of the screen. Consequently, creation or modification of the graphical assets may require duplication across all sizes of the graphical assets. Moreover, the use of duplicate sets of the graphical assets to support multiple screens may increase the overhead in managing the graphical assets within the mobile application, as well as the size of the mobile application.

SUMMARY

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

To reduce overhead associated with managing and updating the user interface of the application, graphical objects may be rendered on screens with different screen sizes, screen densities, and/or resolutions from a single set of scalable representations of the graphical objects. The scalable representations may be provided in one or more font files that are packaged with the application.

To render a graphical object in a user interface of the application, a mapping of a user-interface element in the user interface to the graphical object may be obtained from a layout of the user interface. The mapping may be used to retrieve a scalable representation of the graphical object from a font file, and the scalable representation and an attribute of the screen (e.g., screen density, screen size, resolution) in the electronic device may be used to render the graphical object in the user interface. Such rendering of the graphical object from a scalable, vector-image representation in the font file may thus reduce overhead associated with duplicating and packaging of the graphical object in different sizes to support different screen densities, sizes, and/or resolutions in the electronic device.

The disclosed embodiments provide a system that facilitates execution of an application on an electronic device. During operation, the system obtains a font file comprising a set of scalable representations of graphical assets used in the application. Next, the system obtains a layout of a user interface of the application. The system then obtains, from the layout, a mapping of a user-interface element in the user interface to a scalable representation of a graphical asset in the font file. Finally, the system uses the mapping and the scalable representation to render the graphical asset in the user interface based on an attribute of a screen in the electronic device.

In some embodiments, the system also uses the mapping to identify the font file in a set of font files prior to rendering the graphical asset in the user interface.

In some embodiments, the system also uses the mapping and the scalable representation to render the graphical asset in the user interface based on a style associated with the user-interface element from the mapping.

In some embodiments, using the mapping and the scalable representation to render the graphical asset in the user interface includes: (i) selecting a size of the graphical asset based on the attribute of the screen; (ii) using an index into the font file from the mapping to obtain the scalable representation of the graphical asset; and (iii) using the scalable representation to render the graphical asset in the selected size.

In some embodiments, using the mapping and the scalable representation to render the graphical asset in the user interface further includes selecting the size of the graphical asset based on the style associated with the user-interface element from the mapping.

In some embodiments, the system also updates an appearance of the graphical asset in the user interface based on user input received through the user interface.

In some embodiments, updating the appearance of the graphical asset in the user interface includes changing a color of the graphical asset.

In some embodiments, updating the appearance of the graphical asset in the user interface includes changing a color gradient of the graphical asset.

In some embodiments, updating the appearance of the graphical asset in the user interface includes changing a size of the graphical asset.

In some embodiments, the graphical assets include an image and/or an icon.

In some embodiments, the attribute of the screen is a screen density.

In some embodiments, the attribute of the screen is a resolution.

In some embodiments, the attribute of the screen is a screen size.

BRIEF DESCRIPTION OF THE DRAWINGS

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

To reduce overhead associated with managing and updating the user interface of the application, graphical objects may be rendered on screens with different screen sizes, screen densities, and/or resolutions from a single set of scalable representations of the graphical objects. The scalable representations may be provided in one or more font files that are packaged with the application.

To render a graphical object in a user interface of the application, a mapping of a user-interface element in the user interface to the graphical object may be obtained from a layout of the user interface. The mapping may be used to retrieve a scalable representation of the graphical object from a font file, and the scalable representation and an attribute of the screen (e.g., screen density, screen size, resolution) in the electronic device may be used to render the graphical object in the user interface. Such rendering of the graphical object from a scalable, vector-image representation in the font file may thus reduce overhead associated with duplicating and packaging of the graphical object in different sizes to support different screen densities, sizes, and/or resolutions in the electronic device.

Figure 1:
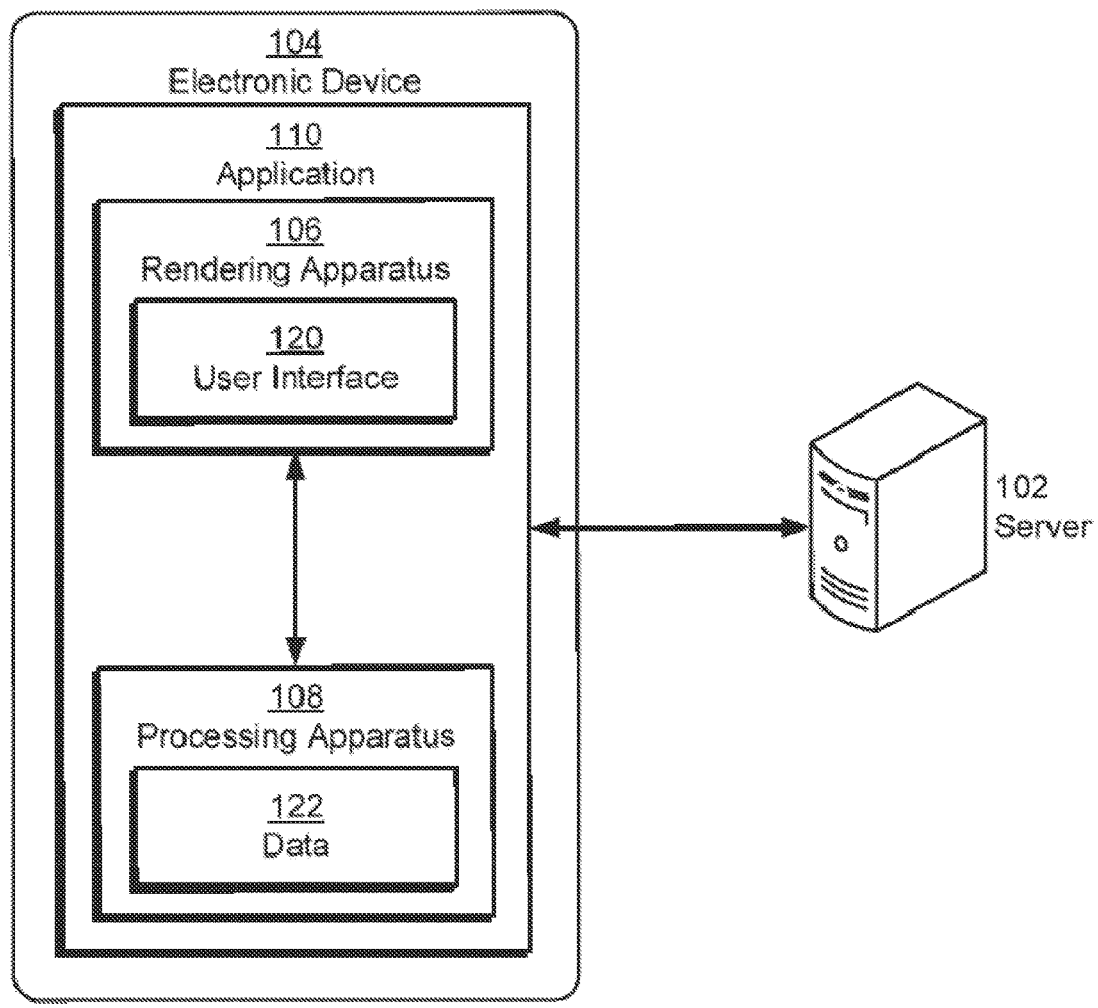
FIG. 1 shows a schematic of a system in accordance with the disclosed embodiments.

The disclosed embodiments provide a method and system for facilitating use of an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform, website, and/or server (e.g., server 102) and installed locally on electronic device 104. Alternatively, application 110 may be a web application that is loaded in a web browser of electronic device 104.

Application 110 may perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data 122 and/or content associated with application 110 from a server 102 and transmit data from application 110 to server 102. For example, electronic device 104 may use a wired, wireless and/or cellular network to send and receive emails, financial information, digital media, game play information, and/or other data 122 or content used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data 122, buttons, and/or other user-interface elements to the user. The GUI may also accept user input (e.g., gestures, keyboard presses, etc.) that is used to manipulate and/or update the elements. In other words, user interface 120 may be a mechanism for displaying or formatting data 122 or content associated with application 110 for use on electronic device 104.

In one or more embodiments, a rendering apparatus 106 in application 110 generates user interface 120 using content obtained from server 102. For example, rendering apparatus 106 may obtain structured data in one or more Extensible Markup language (XML) documents, JavaScript Object Notation (JSON) objects, and/or other types of structured, platform-agnostic data. Rendering apparatus 106 may then use natively executing user-interface components to render one or more views or screens of user interface 120 specified in the structured data. In addition, rendering of user interface 120 may vary with the platform and/or type of electronic device 104. For example, rendering apparatus 106 may tailor the layout of the views in user interface 120 based on the dimensions, orientation (e.g., portrait, landscape, etc.), form factor, and/or input/output (I/O) devices of electronic device 104.

Data 122 collected through user interface 120 may then be used by a processing apparatus 108 in application 110 to perform one or more tasks for the user. For example, processing apparatus 108 may validate data 122, format data 122, use data 122 entered by the user to update a state of application 110, use data 122 to generate additional data or files, and/or commit data 122 to storage on electronic device 104 and/or server 102.

Those skilled in the art will appreciate user interface 120 may be displayed within a variety of screen sizes, screen densities, and/or resolutions on electronic deice 104. For example, application 110 may execute on a mobile device such as a mobile phone, tablet computer, and/or portable media player. A touchscreen of the mobile device may have a variety of sizes, resolutions, pixel densities, and/or form factors. As a result, the size of a graphical asset such as a raster image in application 110 may vary based on the attributes of the touchscreen.

In turn, a design and/or development team for application 110 may be required to duplicate images, icons, and/or other graphical assets in different sizes to support rendering of the graphical assets on different screens. For example, a set of images may be duplicated in six different sizes to support six different pixel densities of available screens in electronic device 104, and all six sets of images may be packaged with an executable version of application 110 to ensure that the images are rendered correctly on all available screens of electronic device 104.

Such duplication of graphical assets to accommodate display of the graphical assets on multiple screens may increase the overhead associated with delivering, managing, and updating application 110. First, the experience design (XD) of application 110 may be complicated by requiring the duplication of graphical assets in different sizes by visual designers, along with the propagation of any changes to the graphical assets across all of the sizes. Second, additional product design (PD) overhead may be incurred during the bundling of multiple sets of the graphical assets into corresponding folders and packaging of the graphical assets with application 110. Finally, inclusion of the graphical assets with application 110 may increase the size of application 110, and in turn, interfere with efficient downloading and installation of application 110 on electronic device 104.

In one or more embodiments, application 110 includes functionality to render graphical assets in user interface 120 on multiple types, sizes, densities, and/or resolutions of screens in electronic device 104 without maintaining duplicated sets of the graphical assets in different sizes. As described in further detail below, rendering apparatus 106 may obtain font files containing scalable (e.g., vector-image) representations of the graphical assets. Rendering apparatus 106 may use the font files and layouts of user interface 120 to render the graphical assets on multiple screen sizes, screen densities, and/or screen resolutions in electronic device 104. Because the font files contain compact, vector-image representations of the graphical assets, a single set of font files may be used with multiple screens of electronic device 104. Consequently, the creation, management, update, and use of the graphical assets with application 110 may be simpler and more efficient than with duplicated sets of raster-image representations of the graphical assets.

Figure 2:
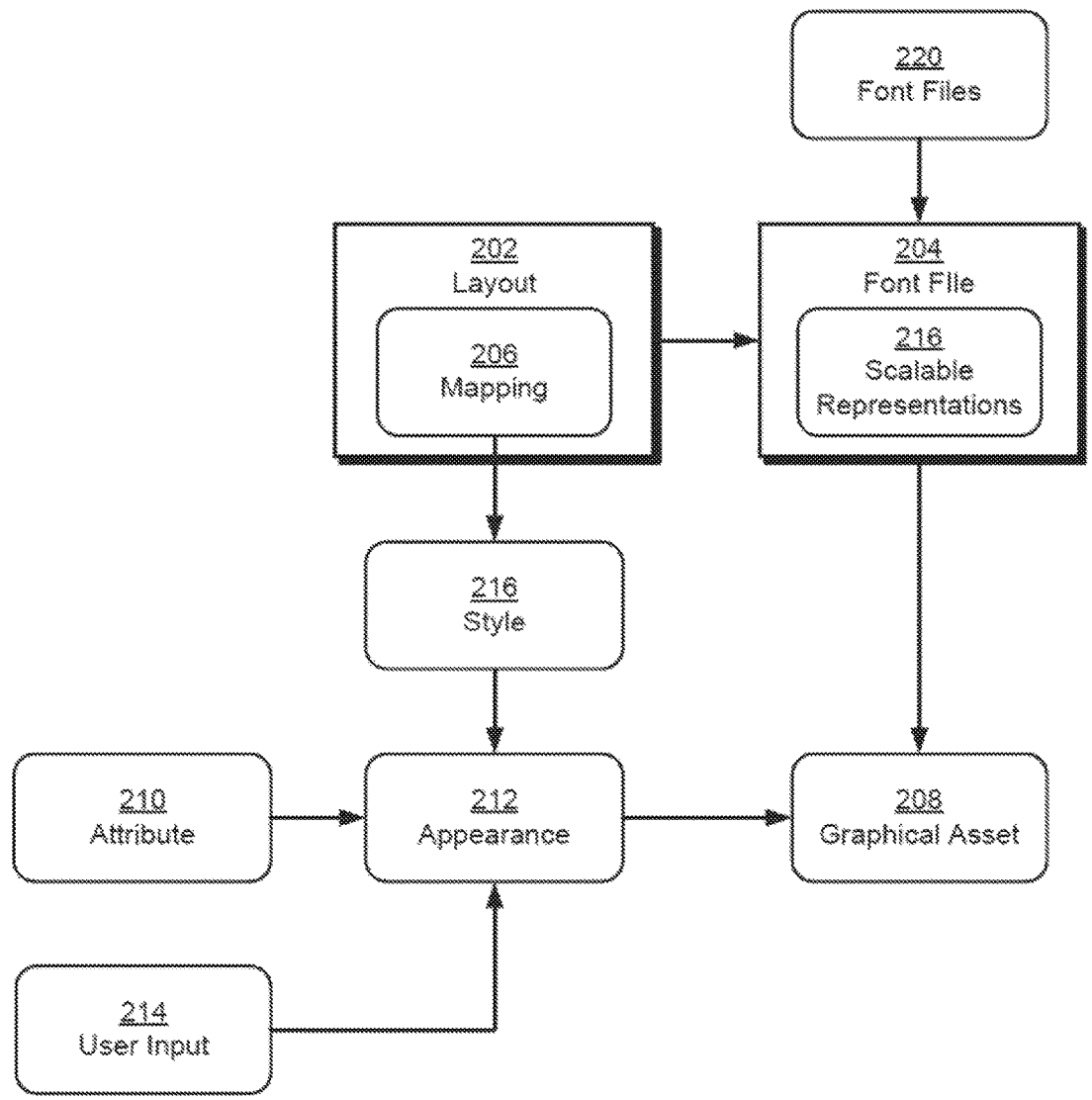
FIG. 2 shows the operation of a rendering apparatus in an electronic device in accordance with the disclosed embodiments.

FIG. 2 shows the operation of a rendering apparatus (e.g., rendering apparatus 106 of FIG. 1) in an electronic device (e.g., electronic device 104 of FIG. 1) in accordance with the disclosed embodiments. As mentioned above, the rendering apparatus may use a single scalable representation of graphical asset 208 in a font file 204 to render a graphical asset 208 in an application (e.g., application 110 of FIG. 1) on multiple screens of the electronic device.

In particular, the rendering apparatus may obtain a layout 202 of a user interface (e.g., user interface 120 of FIG. 1) of the application. Layout 202 may describe views to be included in the user interface. For example, layout 202 may include a JSON object, XML document, and/or other structured data that specifies the text, images, icons, and/or user-interface elements to be included in views of the user interface, with each view representing a different screen of the user interface.

Layout 202 may include a mapping 206 of a user-interface element corresponding to graphical asset 208 in a view to one or more attributes that can be used to render graphical asset 208 in the user interface. Mapping 206 may include a first attribute that identifies a font file 204 containing a scalable representation of graphical asset 208. For example, mapping 206 may provide a name of font file 204 and/or a path to font file 204 in the application. In turn, mapping 206 may be used to select font file 204 from a set of font files 220 for use in rendering graphical asset 208.

Font file 204 may include a collection of glyphs that function as scalable representations 216 of a set of graphical assets to be used in the application. For example, font file 204 may be a TrueType font file that contains vector-image representations of the graphical assets and mappings of the vector-image representations to Unicode code points. Font file 204 may be created by one or more visual designers of the application in lieu of multiple sets of the graphical assets in different sizes. Because glyphs (e.g., characters) in font file 204 are represented by abstract, numeric identifiers (e.g., code points), a single identifier may be mapped to multiple representations of the corresponding glyph in multiple font files 220.

In one or more embodiments, scalable representations 216 of graphical assets in the application are grouped in font file 204 and/or other font files 220 according to a category of the graphical assets. For example, graphical assets for a financial-management application may be grouped into categories such as accounts receivable, accounts payable, assets, fixed assets, vehicles, furniture and fixtures, building assets, machinery and equipment, credit card interest, liabilities, equity, and/or cost of labor. Graphical assets associated with each category may then be placed into one or more font files 220 representing the category.

After a first attribute of mapping 206 is used to identify font file 204 from a collection of font files 220, a second attribute of mapping 206 may be used to identify a scalable representation of graphical asset 208 from a set of scalable representations 216 in font file 204. For example, the second attribute may provide an index into font file 204 (e.g., a Unicode code point and/or character) that is used to obtain the scalable representation of graphical asset 208.

After identifying the scalable representation of graphical asset 208 in font file 204, the rendering apparatus may use mapping 206 and the scalable representation of graphical asset 208 to render graphical asset 208 in the user interface based. As shown in FIG. 2, the rendering apparatus may determine an appearance 212 of graphical asset 208 based on a style 216 from mapping 206, an attribute 210 of a screen in the electronic device, and/or user input 214.

Style 216 may be specified in one or more additional attributes of mapping 206. Style 216 may include the color, color gradient, shading, shadow, decoration, transparency, and/or other parameters that may affect appearance 212. Style 216 may also describe a relative size of graphical asset 208 in the user interface, such as "small," "medium," or "large." Style 216 may thus be used to modify the size and/or other aspects of appearance 212 of graphical asset 208 with respect to other graphical assets in the user interface. Attributes of mappings in layouts of user interfaces of applications are described in further detail below with respect to FIG. 3.

Attribute 210 may include the screen density, screen size, and/or resolution of the screen in the electronic device. Attribute 210 may be combined with a relative size of graphical asset 208 from style 216 to select a size at which graphical asset 208 will be rendered. For example, the screen density, resolution, and/or screen size from attribute 210 and an "intermediate" size from style 216 may be used to select a font size for rendering graphical asset 208 so that graphical asset 208 occupies a certain number of density-independent pixels (dp) representing the "intermediate" size within the screen. Thus, for two screens with the same screen size and different screen densities, graphical asset 208 may be rendered to occupy the same number of dp units on both screens by selecting a larger font size for graphical asset 208 on the higher-density screen and a smaller font size for graphical asset 280 on the lower-density screen.

Once a size is selected for graphical asset 208 based on attribute 210 and/or style 216, the rendering apparatus may use an index into font file 204 from mapping 206 to obtain the scalable representation of graphical asset 208 and use the scalable representation to render the graphical asset in the selected size. For example, the rendering apparatus may match a Unicode code point and/or character representing the scalable representation from mapping 206 to the corresponding glyph in font file 204. The rendering apparatus may then render the glyph in a font size that is selected based on style 216 and attribute 210. The rendering apparatus may also use other parameters associated with style 216 (e.g., color, shading, shadow, decoration, transparency, etc.) to render graphical asset 208.

After graphical asset 208 is rendered, the rendering apparatus may also update appearance 212 of graphical asset 208 in the user interface based on user input 214 received through the user interface. For example, the rendering apparatus may change the color, color gradient, shading, shadow, decoration, transparency, size, orientation, and/or other aspect of appearance 212 upon detecting an event such as the passing of a cursor over graphical asset 208, the selection of graphical asset 208, the dragging of graphical asset 208 across the screen, keyboard input, and/or a transition between two views of the user interface.

Figure 3:
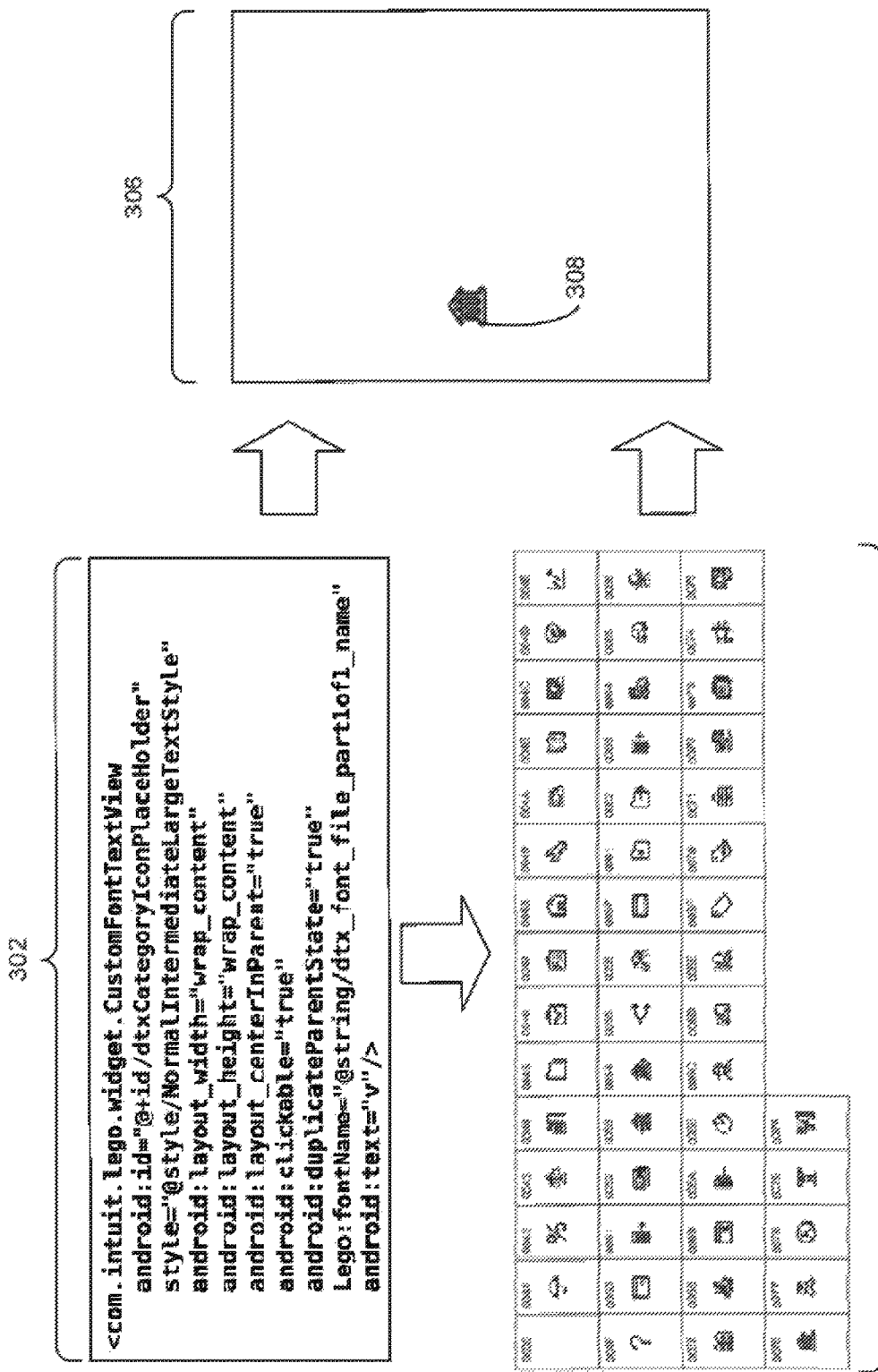
FIG. 3 shows the exemplary rendering of a graphical asset in a user interface of an application on an electronic device in accordance with the disclosed embodiments.

FIG. 3 shows the exemplary rendering of a graphical asset 308 in a user interface (e.g., user interface 120 of FIG. 1) of an application on an electronic device in accordance with the disclosed embodiments. As mentioned above, graphical asset 308 may be rendered using a mapping 302 of a user-interface element in the user interface to a scalable representation of graphical asset 308 in a font file 304.

Mapping 302 includes a number of attributes that are used to render the user-interface element. First, mapping 302 includes an identifier for the user-interface element (e.g., "@+id/dtxCategoryIconPlaceHolder"). Next, mapping 302 specifies a style of the user-interface element (e.g., "@style/NormalIntermediateLargeTextStyle").

Mapping 302 also includes a number of parameters related to a layout of the user-interface element, such as a layout width (e.g., "android:layout_width"), a layout height (e.g., "android:layout_height"), and a centering (e.g., "android:layout_centerInParent"). Mapping 302 may then specify a number of attributes related to the state of the user-interface element, such as a clickability (e.g., "android:clickable") and a duplication of a state of the user-interface element's parent (e.g., "android:duplicateParentState").

Finally, mapping 302 may provide a name of font file 304 (e.g., "@string/dtx_font_file_part1of1_name") and an index into font file 304 (e.g., "v") for graphical asset 308.

The name of font file 304 and the index into font file 304 from mapping 302 may be used to obtain the scalable representation of graphical asset 308 from font file 304. For example, font file 304 may be retrieved using the name of "@string/dtx_font_file_part1of1_name" in mapping 302, and the Unicode code point corresponding to the character of "v" (e.g., 0076) may be used to obtain a glyph representing graphical asset 308 from font file 304.

Graphical asset 308 may then be rendered using the standardized representation from font file 304, an attribute of a screen 306 in the electronic device, and one or more attributes from mapping 302. For example, the screen density, screen size, and/or resolution of screen 306 may be combined with the "NormalIntermediateLargeTextStyle" attribute from mapping 302 to select a font size for rendering graphical asset 308 so that graphical asset 308 conforms to the "NormalIntermediateLargeTextStyle" within screen 306. Graphical asset 308 may then be rendered in a given location in screen 306 and/or configured based on the layout or state attributes from mapping 302.

Figure 4:
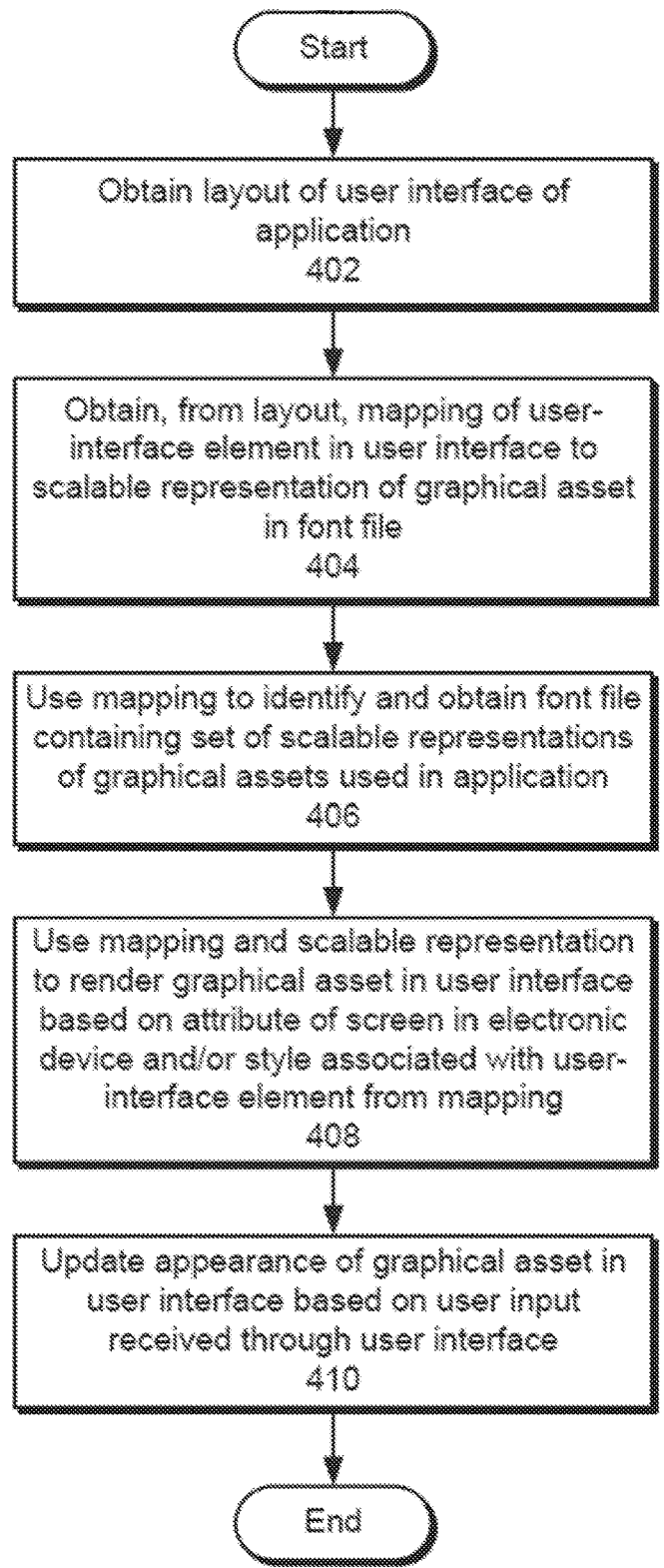
FIG. 4 shows a flowchart illustrating the process of facilitating execution of an application on an electronic device in accordance with the disclosed embodiments.

FIG. 4 shows a flowchart illustrating the process of facilitating execution of an application on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a layout of a user interface of the application is obtained (operation 402). For example, the layout may be obtained as platform-agnostic structured data. The layout may define and describe a set of user-interface elements to be displayed in one or more views of the user interface.

Next, a mapping of a user-interface element in the user interface to a scalable representation of a graphical asset in a font file is obtained from the layout (operation 404). For example, the layout may be parsed to identify a mapping that is specified in a JSON object, XML element, and/or other unit of structured data in the layout. The mapping may identify an icon, image, and/or other graphical asset to be used displayed in the user interface. The mapping is used to identify and obtain a font file containing a set of scalable representations of graphical assets used in the application (operation 406). For example, a name and/or path of the font file may be used to identify and retrieve the font file from a set of font files that are packaged with the application.

The mapping and scalable representation are then used to render the graphical asset in the user interface based on an attribute of the screen in the electronic device and/or a style associated with the user-interface element from the mapping (operation 408), as described in further detail below with respect to FIG. 5. Finally, the appearance of the graphical asset in the user interface is updated based on user input received through the user interface (operation 410). For example, the color, color gradient, size, transparency, orientation, location, shadowing, shading, decoration, and/or other visual aspect of the graphical asset may be updated in response to a cursor position, keyboard input, a selection of the graphical asset, a transition between two views of the user interface, and/or other user input into the user interface.

Figure 5:
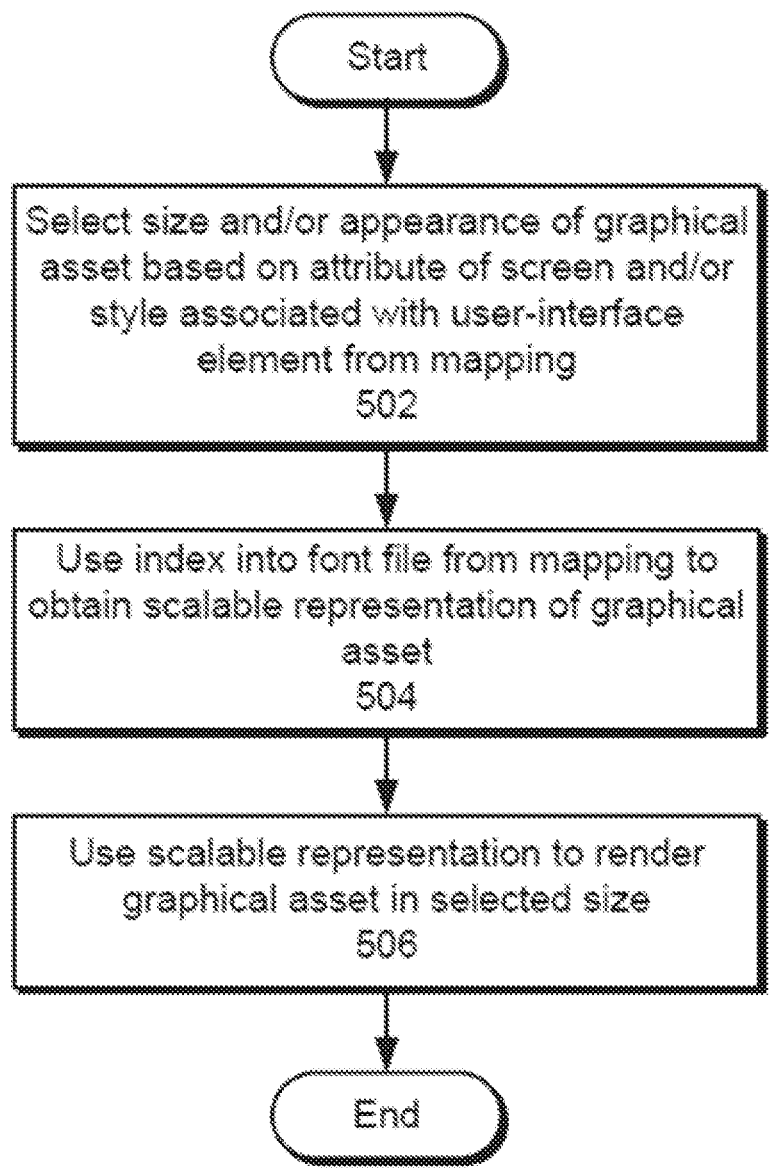
FIG. 5 shows a flowchart illustrating the process of using a mapping and a scalable representation of a graphical asset to render the graphical asset in a user interface of an electronic device in accordance with the disclosed embodiments.

FIG. 5 shows a flowchart illustrating the process of using a mapping and a scalable representation of a graphical asset to render the graphical asset in a user interface of an electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a size and/or appearance of the graphical asset are selected based on an attribute of a screen on the electronic device and/or a style associated with a user-interface element from the mapping (operation 502). For example, a relative size of the graphical asset may be obtained from the style in the mapping, and the relative size may be mapped to a pre-specified number of dp units based on a screen density, screen size, and/or resolution of the screen. The size (e.g., a font size) of the graphical asset may then be selected so that the graphical asset occupies the pre-specified number of dp units within the screen. Similarly, the appearance of the graphical asset may reflect a color, color gradient, shading, shadow, decoration, transparency, and/or other parameter from the mapping.

Next, an index into a font file from the mapping is used to obtain a scalable representation of the graphical asset (operation 504). For example, the index may be a Unicode code point that is matched to a corresponding glyph in the font file. Finally, the scalable representation is used to render the graphical asset in the selected size (operation 506). For example, the graphical asset may be rendered by rasterizing the scalable representation in the selected font size within the user interface.

Figure 6:
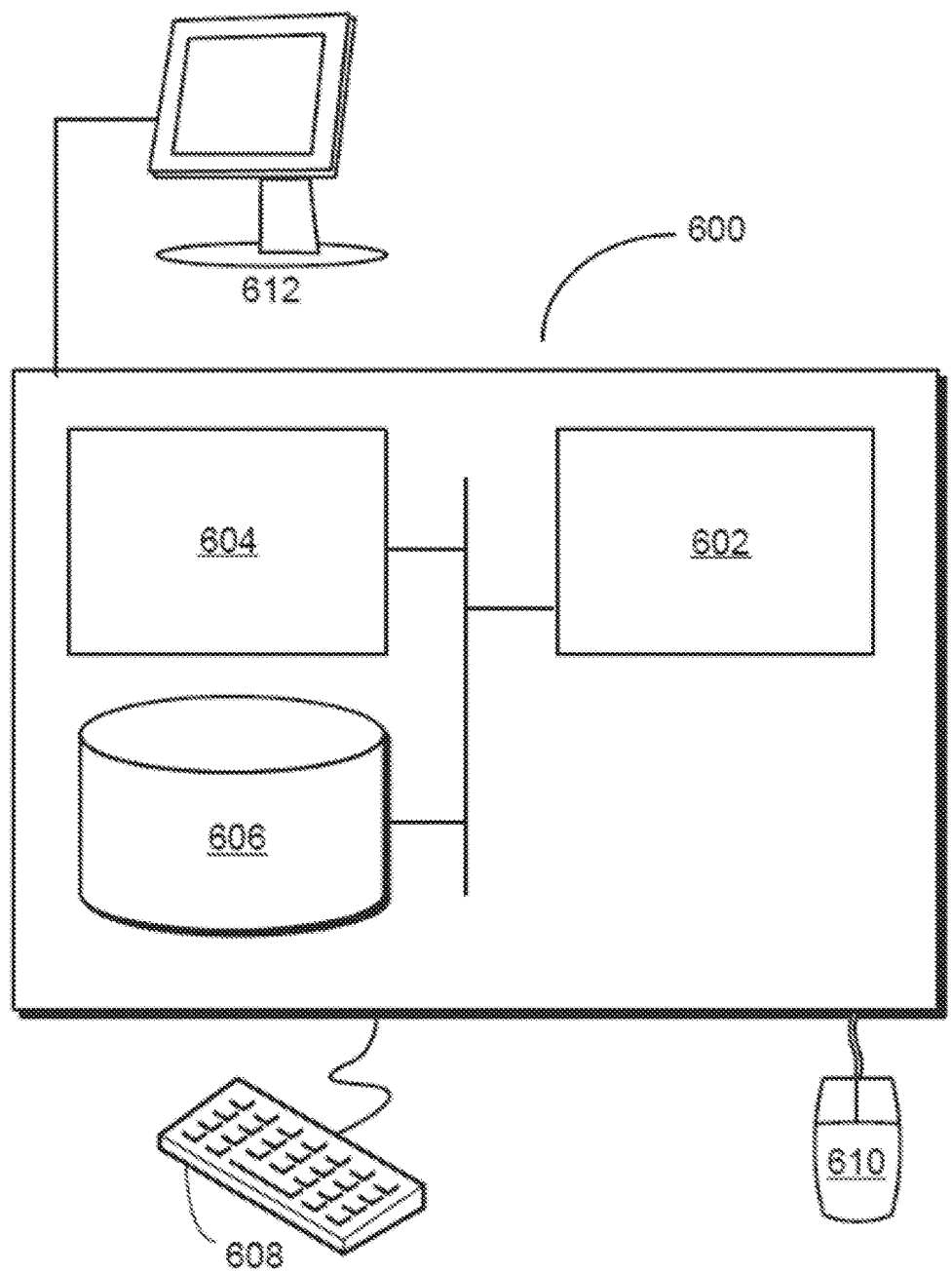
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating execution of an application on an electronic device. The system may include a rendering apparatus that obtains a font file containing a set of scalable representations of graphical assets used in the application, as well as a layout of a user interface of the application. Next, the rendering apparatus may obtain, from the layout, a mapping of a user-interface element in the user interface to a scalable representation of a graphical asset in the font file. The rendering apparatus may then use the mapping and the scalable representation to render the graphical asset in the user interface based on an attribute of a screen in the electronic device and/or a style associated with the user-interface element from the mapping.

In addition, one or more components of computer system 600 may be remotely located and connected to the other components over a network. Portions of the present embodiments (e.g., rendering apparatus, processing apparatus, server, etc.) may also be located on different nodes of a distributed system that implements the embodiments. For example, the present embodiments may be implemented using a cloud computing system that processes scalable representations of graphical assets for rendering of the graphical assets on a set of remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating execution of an application on an electronic device, comprising:
   obtaining, at the electronic device, a structured layout file, comprising:
      structured data describing a view of a user interface of the application;
      a mapping of a user-interface element used in the view to a corresponding single scalable graphical asset;
      a name of a font file comprising the single scalable graphical asset;
      a path to the font file comprising the single scalable graphical asset; and
      a style associated with the user interface element; and
   obtaining, by the electronic device, the font file at the path, the font file comprising the single scalable graphical asset;
   determining an attribute related to a display of the electronic device;
   rendering the single scalable graphical asset for use in the view of the user interface as a set number of density-independent pixels based on the style associated with the user interface element and the attribute of the display of the electronic device; and
   displaying the single scalable graphical asset in the view of the user interface of the application on the display of the electronic device.

2. The method of claim 1, wherein the structured data file comprises a JavaScript Object Notation (JSON) file.

3. The method of claim 1, wherein the structured data file comprises an Extensible Markup language (XML) file.

4. The method of claim 1, wherein the attribute related to the display is one of:
- a display resolution;
- a display density; or
- an orientation of the display.

5. The method of claim 1, wherein the style comprises a relative size attribute.

6. The method of claim 1, wherein the scalable graphical asset is a vector image.

7. An electronic device comprising:
- a display;
- a memory comprising executable instructions;
- a processor in data communication with the memory and configured to execute the executable instructions and to cause the electronic device to perform a method for facilitating execution of an application on an electronic device, the method comprising:
  - obtaining, at the electronic device, a structured layout file, comprising:
    - structured data describing a view of a user interface of the application;
    - a mapping of a user-interface element used in the view to a corresponding single scalable graphical asset;
    - a name of a font file comprising the single scalable graphical asset;
    - a path to the font file comprising the single scalable graphical asset; and
    - a style associated with the user interface element; and
  - obtaining, by the electronic device, the font file at the path, the font file comprising the single scalable graphical asset;
  - determining an attribute related to the display of the electronic device;
  - rendering the single scalable graphical asset for use in the view of the user interface as a set number of density-independent pixels based on the style associated with the user interface element and the attribute of the display of the electronic device; and
  - displaying the single scalable graphical asset in the view of the user interface of the application on the display of the electronic device.

8. The electronic device of claim 7, wherein the structured data file comprises a JavaScript Object Notation (JSON) file.

9. The electronic device of claim 7, wherein the structured data file comprises an Extensible Markup language (XML) file.

10. The electronic device of claim 7, wherein the attribute related to the display is one of:
- a display resolution;
- a display density; or
- an orientation of the display.

11. The electronic device of claim 7, wherein the style comprises a relative size attribute.

12. The electronic device of claim 7, wherein the scalable graphical asset is a vector image.

13. A non-transitory computer-readable medium comprising executable instructions that, when executed by a processor of an electronic device, cause the electronic device to perform a method for facilitating execution of an application on an electronic device, the method comprising:
- obtaining, at the electronic device, a structured layout file, comprising:
  - structured data describing a view of a user interface of the application;
  - a mapping of a user-interface element used in the view to a corresponding single scalable graphical asset;
  - a name of a font file comprising the single scalable graphical asset;
  - a path to the font file comprising the single scalable graphical asset; and
  - a style associated with the user interface element; and
- obtaining, by the electronic device, the font file at the path, the font file comprising the single scalable graphical asset;
- determining an attribute related to a display of the electronic device;
- rendering the single scalable graphical asset for use in the view of the user interface as a set number of density-independent pixels based on the style associated with the user interface element and the attribute of the display of the electronic device; and
- displaying the single scalable graphical asset in the view of the user interface of the application on the display of the electronic device.

14. The non-transitory computer-readable medium of claim 13, wherein the structured data file comprises one of: a JavaScript Object Notation (JSON) file or an Extensible Markup language (XML) file.

15. The non-transitory computer-readable medium of claim 13, wherein the attribute related to the display is one of:
- a display resolution;
- a display density; or
- an orientation of the display.

16. The non-transitory computer-readable medium of claim 13, wherein the style comprises a relative size attribute.

17. The non-transitory computer-readable medium of claim 13, wherein the scalable graphical asset is a vector image.

* * * * *